(12) United States Patent
Nagata

(10) Patent No.: US 7,054,016 B2
(45) Date of Patent: May 30, 2006

(54) INFORMATION PROCESSING APPARATUS AND METHOD WITH PAPER SIZE SETTING AND DISPLAY OF AN OUTPUT SETTING

(75) Inventor: Koji Nagata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 916 days.

(21) Appl. No.: 09/930,452

(22) Filed: Aug. 16, 2001

(65) Prior Publication Data

US 2002/0054343 A1 May 9, 2002

(30) Foreign Application Priority Data

Aug. 18, 2000 (JP) .............................. 2000/248102

(51) Int. Cl.
*G06F 3/12* (2006.01)

(52) U.S. Cl. .................... 358/1.13; 358/1.15; 710/8; 399/81

(58) Field of Classification Search ................ 358/1.5, 358/1.16, 1.2, 451, 1.13; 399/81; 710/8
See application file for complete search history.

(56) References Cited

U.S. PATENT DOCUMENTS

| | | | |
|---|---|---|---|
| 5,727,135 A * | 3/1998 | Webb et al. ................ 358/1.14 |
| 5,872,569 A * | 2/1999 | Salgado et al. ............. 715/764 |
| 6,094,548 A * | 7/2000 | Gunning et al. .............. 399/75 |
| 6,741,269 B1 * | 5/2004 | Morikawa .................... 715/781 |

* cited by examiner

*Primary Examiner*—King Y. Poon
*Assistant Examiner*—Lucas Divine
(74) *Attorney, Agent, or Firm*—Fitzpatrick, Cella, Harper & Scinto

(57) ABSTRACT

An input paper size of a document which is inputted from an application and an output paper size of print data which is printed by the printer are set. In a print control apparatus for forming the print data on the basis of the input paper size and the output paper size which are set, when the input paper size is set, the print control apparatus is executed so as to display the paper sizes which are supported by the printer and the paper sizes which are not supported by the printer so that they can be discriminated.

15 Claims, 7 Drawing Sheets

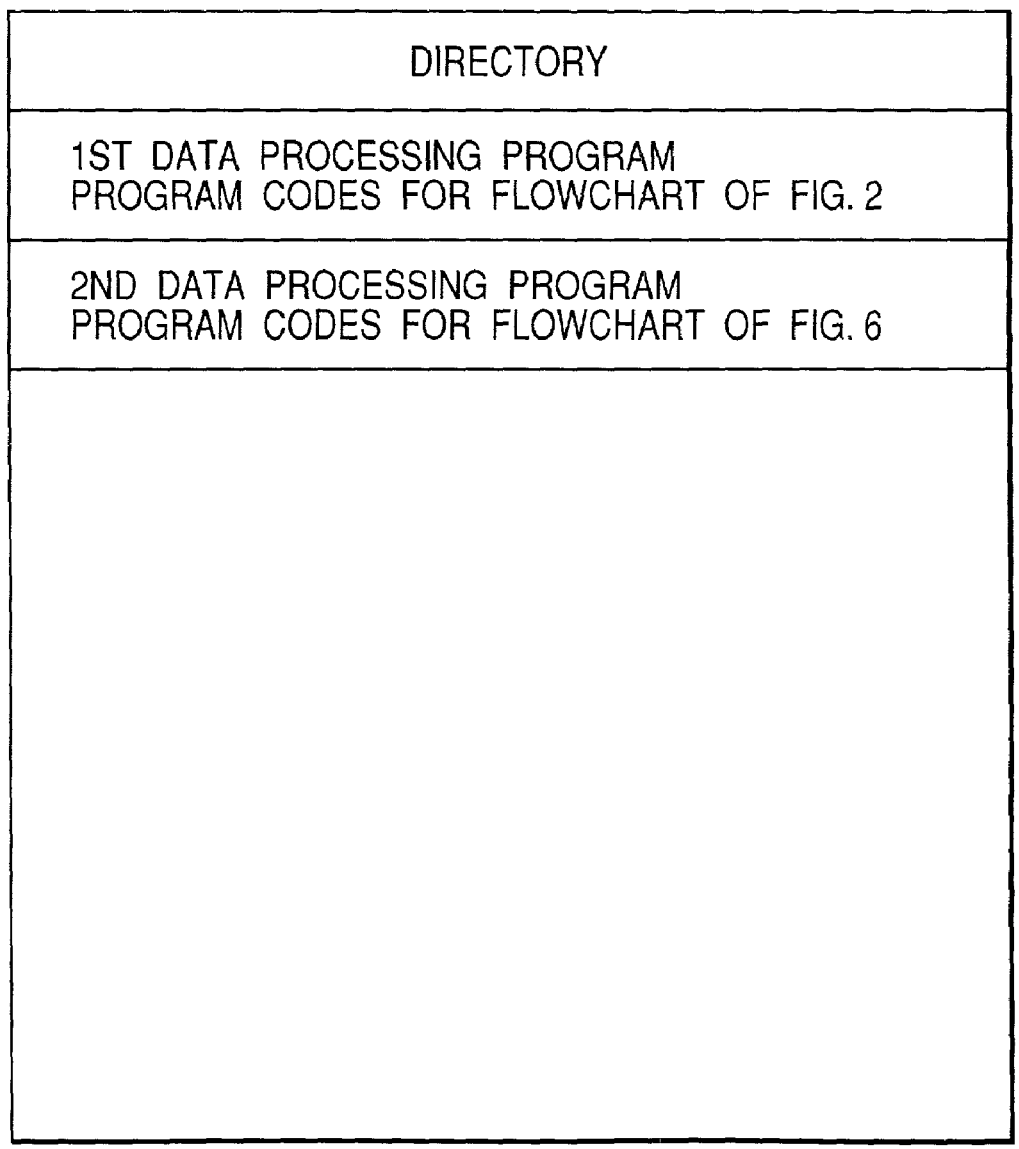

INFORMATION PROCESSING APPARATUS AND METHOD WITH PAPER SIZE SETTING AND DISPLAY OF AN OUTPUT SETTING

BACKGROUND OF THE INVENTION

1. Field of the Invention

The invention relates to a print control apparatus, a print control method, and a print control program for processing a printing request from an application, forming print data which can be printed by a printer, and transferring the print data to the outside.

2. Related Background Art

Hitherto, in a printer control system in which an information processing apparatus and a printer can communicate with each other, as one of output processing methods of print data, a printer driver of the information processing apparatus has a scaling print function.

In the printer driver of the information processing apparatus, as shown in FIG. 3, it is necessary to designate a paper size 301 of print information which is inputted from an application and a paper size 302 of a paper which is printed by the printer. As a paper size of the printer (hereinbelow, such a size is referred to as an output paper size), only a paper size supported by the printer can be selected. On the other hand, since a paper size which is inputted from the application (hereinbelow, such a size is referred to as an input paper size) is a size of document formed by the user, there is a possibility that many sizes exist.

However, according to the conventional printer driver, the number of candidates of the input paper size and the number of candidates of the output paper size are equalized and they are displayed as a list. Therefore, usually, since papers of fixed large sizes which are not supported by the printer in a selection item list of the input paper size are not displayed as a list on a display on the host side, in the case where the paper of a document to be printed is formed by a paper of the fixed large size which is not supported by the printer, since the user cannot designate such a paper size by the printer driver, there is a case where he misunderstands that the print paper cannot be outputted. There is, consequently, a problem such that the scaling print function is not utilized.

At the time of the scaling print, even if the apparatus recognizes a situation such that the paper of the fixed large size which is not supported by the printer can be selected, with respect to the operation upon printing by the user, it is necessary to first select a setting of the scaling print, so that there is a problem such that the operation upon printing becomes complicated.

SUMMARY OF THE INVENTION

The invention is made to solve the above problems and it is an object of the invention to provide a print control apparatus for processing a printing request from an application and forms print data which can be printed by a printer, comprising: paper size setting means for setting an input paper size of a document which is inputted from the application and an output paper size of print data which is printed by the printer; and forming means for forming the print data on the basis of the input paper size and output paper size which are set by the paper size setting means, wherein when the input paper size is set, the paper size setting means displays a paper size which is supported by the printer and a paper size which is not supported by the printer so that they can be discriminated. Another object of the invention is to provide a print control method and a memory medium for realizing such a print control apparatus.

According to the first aspect of the invention, there is provided a print control apparatus for processing a printing request from an application and forming print data which can be printed by a printer, comprising: paper size setting means for setting an input paper size of a document which is inputted from an application and an output paper size of print data which is printed by the printer; and forming means for forming the print data on the basis of the input paper size and output paper size which are set by the paper size setting means, wherein when the input paper size is set, the paper size setting means displays a paper size which is supported by the printer and a paper size which is not supported by the printer so that they can be discriminated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram for explaining a memory map of a memory medium for storing various data processing programs which can be read out by a print system to which the print control apparatus according to the invention can be applied.

DETAILED DESCRIPTION OF THE PREFERRED EMBODIMENT

A preferred embodiment of the invention will now be described hereinbelow in detail with reference to the drawings.

Figure 1:
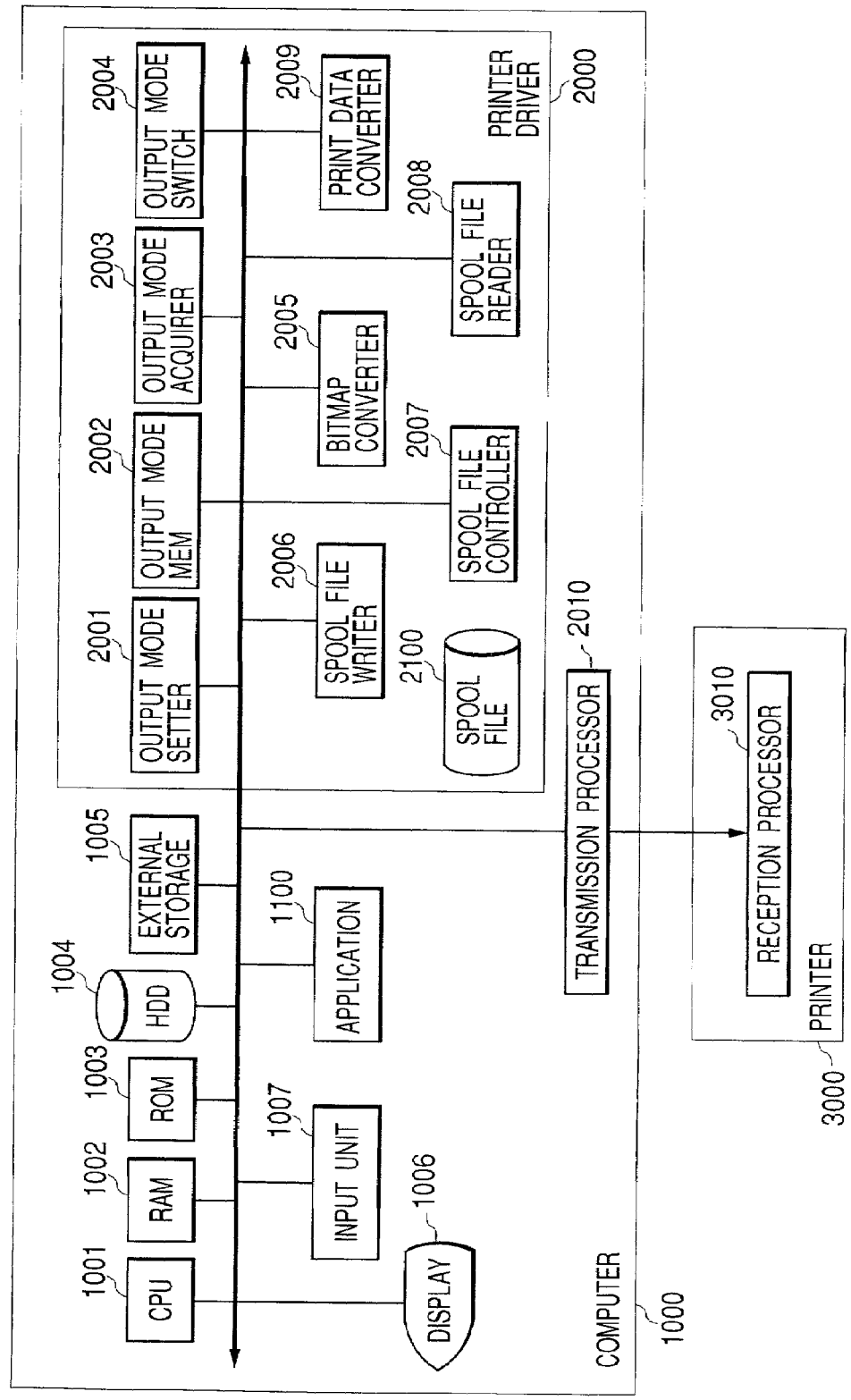
FIG. 1 is a block diagram for explaining a construction of a printer control system to which a print control apparatus showing the first embodiment of the invention can be applied.

FIG. 1 is a block diagram for explaining a construction of a printer control system to which a print control apparatus showing the first embodiment of the invention can be applied. FIG. 1 corresponds to a case where it is constructed by a print system in which a computer 1000 and a printer 3000 can communicate through a predetermined bidirectional interface.

In the computer 1000 functioning as a host computer as a print control apparatus of the invention, a controller has a well-known construction comprising: a CPU 1001; an RAM 1002; an ROM 1003; a hard disk storage (HDD) 1004; a display 1006; and an input unit 1007 such as keyboard, mouse, or the like. The controller further has an external storage 1005. The external storage 1005 may be a device which can freely write into or read from a removable storage medium such as DVD-ROM, CD-ROM, PD, MO, FD, JAZZ (trademark), JIP (trademark), various magnetic tapes.

The RAM 1002 is used as a work area of the CPU 1001 or an area for temporarily storing data.

The computer 1000 reads out various application software 1100 and a printer driver 2000 from those external storages 1005, loads them into the HDD 1004 or RAM 1002, and allows them to be executed by the CPU 1001.

The printer driver 2000 allows a characteristic output processing operation of the invention to be made the most of. In FIG. 1, the printer driver 2000 and a spool file 2100 which is formed by the printer driver 2000 are constructed as different media.

The printer driver 2000 is loaded into other various readable/writable memory media and can be executed. It can be also preliminarily stored into a non-volatile memory device such as ROM, NVRAM, or the like or can be also loaded into a storage by communicating with another apparatus or the like through a network.

Print data formed by the printer driver 2000 is transmitted to a reception processor 3010 of the printer 3000 as a printing apparatus by a transmission processor 2010.

In the printer driver 2000, reference numeral 2001 denotes an output mode setter by which the user changes a setting of an output mode of the print data. Screen information of a UI (user interface) which is displayed on the display 1006 is also included here. Reference numeral 2002 denotes an output mode memory for storing the setting of the output mode (hereinafter, referred to as print set information) of the print data set by the output mode setter 2001.

Reference numeral 2003 denotes an output mode acquirer for obtaining the setting of the output mode (print set information) of the print data stored by the output mode memory 2002. Reference numeral 2004 denotes an output mode switch for switching a foreground process/background process as a printing process in accordance with the setting state of the print set information obtained by the output mode acquirer 2003. The foreground process is a process such that while the print information is inputted from the application 1100 through the OS, the printer driver 2000 executes in parallel a converting process for converting it into the print data which can be interpreted by the printer 3000. On the other hand, the background process is a process such that when the print information is inputted from the application 1100 through the OS, the printer driver 2000 temporarily spools it into the spool file 2100 as an intermediate data file which can be easily converted, and after completion of the spooling, the printer driver 2000 executes the converting process of the print data. Generally, in case of the process for converting the print information into the intermediate data file, a load is light and the process hardly remain. Therefore, the application 1100 can continuously outputs the print information and the printing process (process for outputting the print information) of the application 1100 is finished early, so that there is an effect such that the application 1100 can release the printing function early. Reference numeral 2005 denotes a bitmap converter for converting the print information into bitmap data in accordance with the setting state of the print set information obtained by the output mode acquirer 2003.

Reference numeral 2006 denotes a spool file writer. When the printing process is switched to the background process by the output mode switch 2004, the spool file writer 2006 stores the print information as print data from the application 1100 as an intermediate data file into the spool file 2100. Reference numeral 2007 denotes a spool file controller for controlling a display of an outputting order of the intermediate data file stored in the spool file writer 2006, a designation of a storage destination of the spool file, and the like. Reference numeral 2008 denotes a spool file reader for reading the intermediate data file to be printed from the spool file 2100.

Reference numeral 2009 denotes a print data converter for converting the bitmap data converted by the bitmap converter 2005 into the print data in a data format suitable for a desired print output of the printer 3000. Reference numeral 2010 denotes the transmission processor for transmitting the print data converted by the print data converter 2009 so as to be printed by the printer 3000. Although FIG. 1 shows an example in which the computer 1000 as a print control apparatus and the printer 3000 as a printing apparatus are connected locally, the invention is not limited to such an example. They can be also connected through the network such as an LAN or the like. In this case, the computer 1000 transmits the print data to a print server (not shown) and the print server can monitor a state of the printer 3000 and transfer the print data to the printer 3000.

Figure 2:
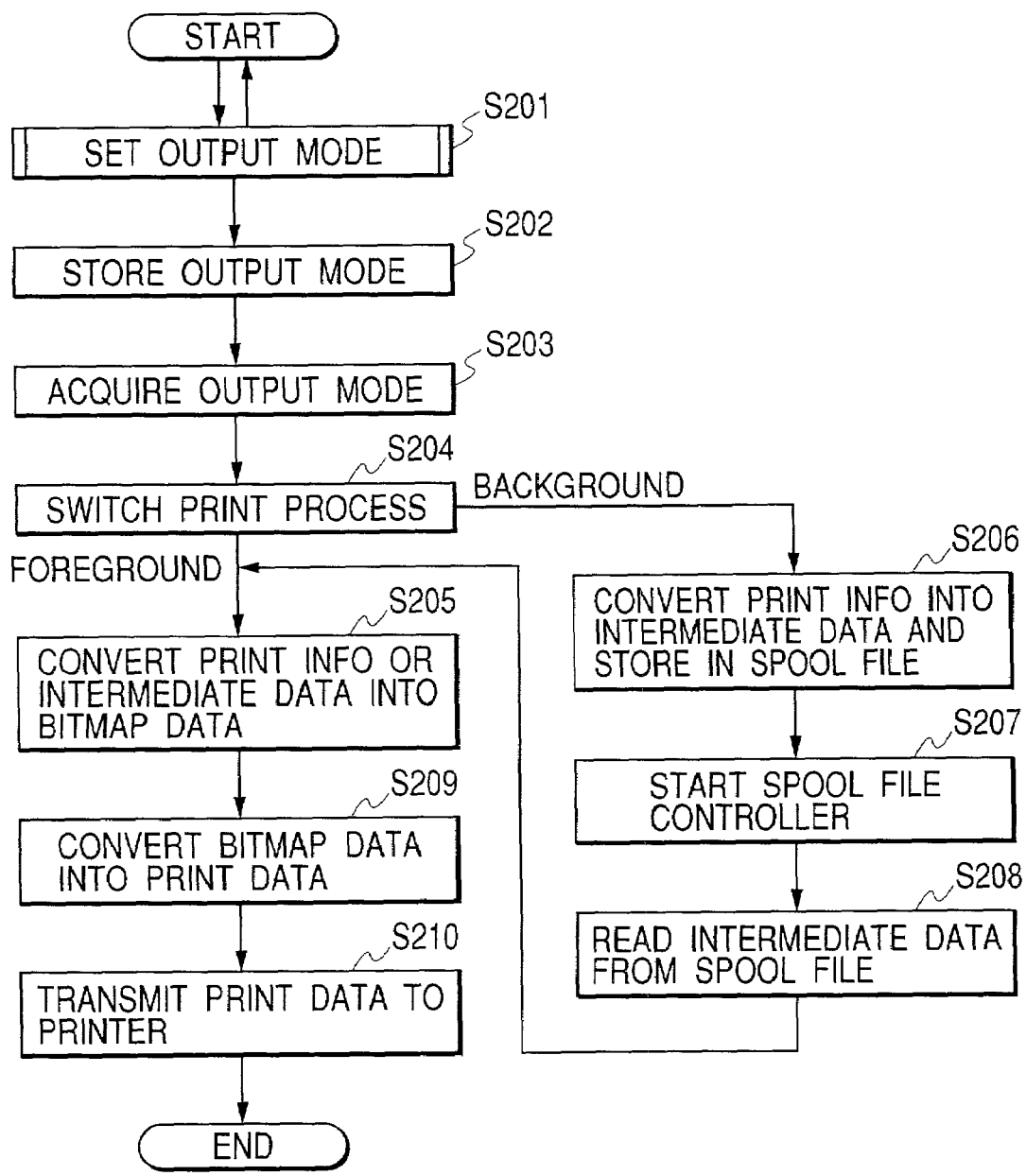
FIG. 2 is a flowchart for explaining a first data processing procedure based on the output processing operation of each module constructing a printer driver shown in FIG. 1.

FIG. 2 is a diagram for explaining a first data processing procedure based on the output processing operation of each module constructing the printer driver 2000 shown in FIG. 1. In FIG. 2, steps S201 to S210 are allocated to the processes which are executed by the component elements 2001 to 2010 shown in FIG. 1.

Figure 3:
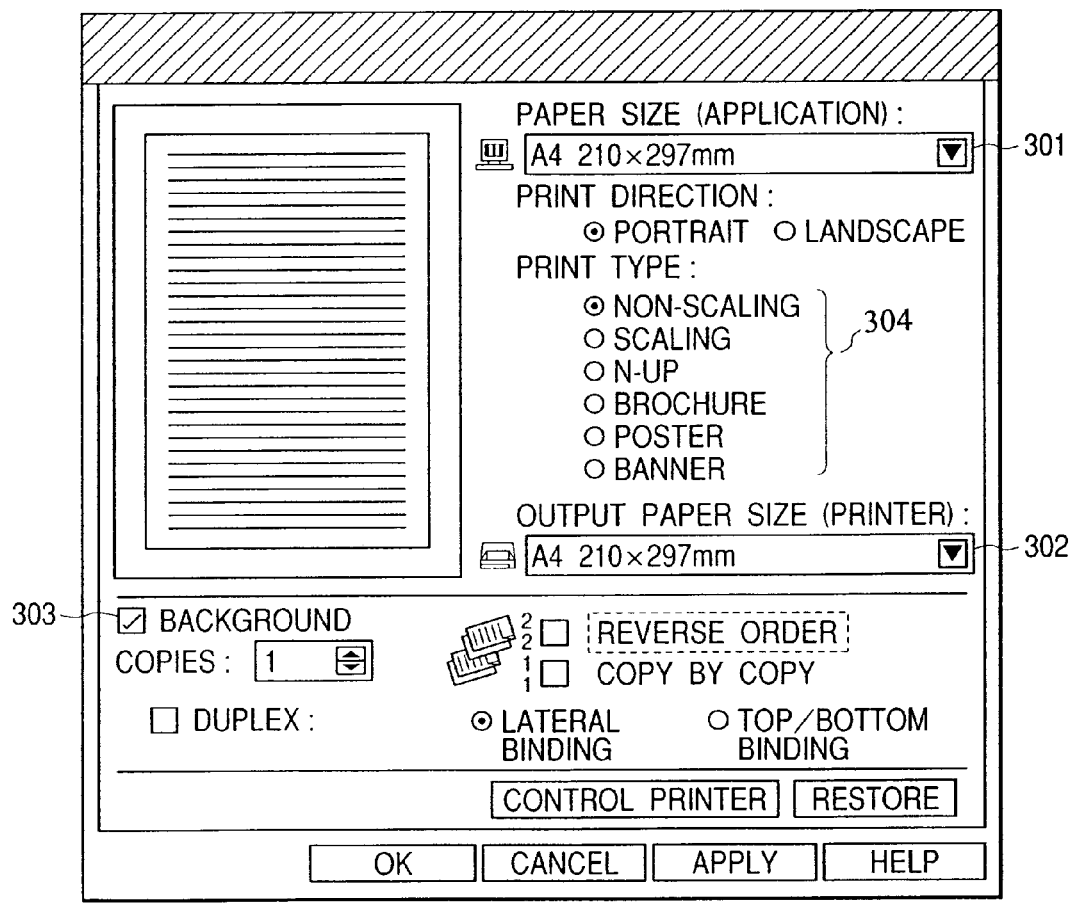
FIG. 3 is a diagram showing an example of a user interface which is displayed on a display of a computer shown in FIG. 1.

First, in step S201, in order to allow the user to set the output mode of the print data on the computer 1000 by the output mode setter 2001, the print information of the UI constructed by a GUI shown in FIG. 3 is outputted to the OS and displayed on the display 1006.

Figure 4:
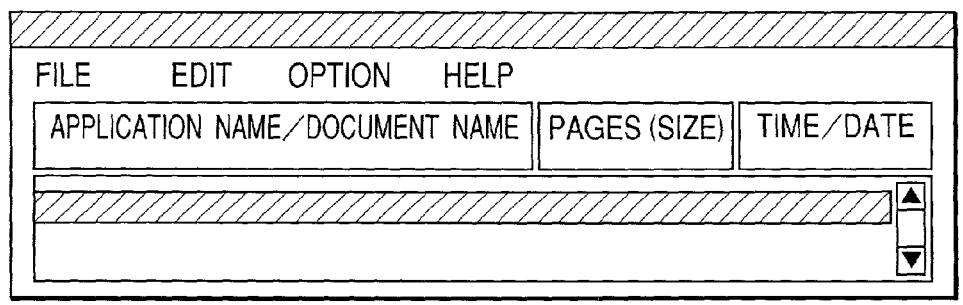
FIG. 4 is a diagram showing an example of a user interface which is displayed on the display of the computer shown in FIG. 1.
Figure 5:
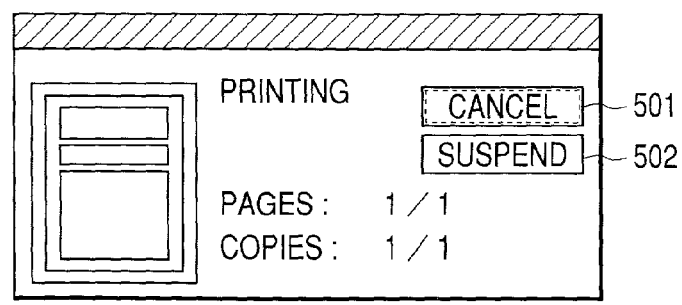
FIG. 5 is a diagram showing an example of a user interface which is displayed on the display of the computer shown in FIG. 1.

FIGS. 3 to 5 are diagrams showing an example of the user interface (UI) which is displayed on the display 1006 of the computer 1000 shown in FIG. 1. FIG. 3 corresponds to an example of an output mode setting GUI picture plane having a preview display portion. FIG. 4 corresponds to an example of a spool file control GUI picture plane. FIG. 5 corresponds to an example of a spool file reading situation display GUI picture plane.

In the case where the setting of the output mode by the user through the UI is finished and the actual print output is performed, in step S202, the output mode memory 2002 stores the print set information (including the output mode) set by the UI displayed by the output mode setter 2001 in step S201.

In step S203, the output mode acquirer 2003 obtains the setting of the output mode stored in the output mode memory 2002. In step S204, the output mode switch 2004 discriminates whether the setting of the output mode obtained in step S203 indicates the foreground process or the background process. In accordance with a result of the discrimination, the output mode switch 2004 switches the foreground process/background process of the print output mode. The discrimination about the foreground process/background process is realized by checking whether a check box 303 in FIG. 3 has been marked or not.

In case of performing the print output process by the foreground on the basis of a result of the switching of the output mode switch 2004, the processing routine advances to step 5205. The bitmap converter 2005 inputs the print information from the application 1100 through the OS and converts the print information into the bitmap data according to a resolution of the printer 3000 in parallel with the inputting process. If a "scaling print", an "N-up print", a "brochure print", a "poster print", or the like (304) has been set by the print set information in FIG. 3, the bitmap converter 2005 forms to the bitmap data at an output paper size different from the input paper size of one page of the print information which is inputted from the application 1100. The "scaling print" is a process for magnifying or reducing one page of the input paper size to one page of the output paper size. The "N-up print" is a process for reducing and arranging a plurality of pages of the input paper size to one page of the output paper size. The "brochure print" is a process for reducing and arranging four pages of the input paper size to both sides of the output paper size every two pages. The "poster print" is a process for magnifying and arranging one page of the input paper size to a plurality of pages of the output paper size.

In case of performing the print output process by the background on the basis of the switching result in step S204, the processing routine advances to step S206. The spool file writer 2006 inputs the print information from the application 1100 through the OS and stores the inputted print information into the spool file 2100 on the memory medium designated in a unique file format (intermediate data format).

Simultaneously with the start of the storage of the spool file, the spool file writer 2006 activates the spool file controller 2007 in step S207. The spool file controller 2007 is an execution program for performing a spool file control such as display of the outputting order of the spool files, designation of the storage destination, or the like and displays a UI picture plane which was constructed by the GUI and shown in, for example, FIG. 4 onto the display 1006.

FIG. 4 shows a UI picture plane for displaying a task during the printing and information such as "application name/document name" in a print waiting state, "pages (the number of pages) (size)", "time/date", and the like is displayed. While monitoring a spooling situation of the spool file 2001, the spool file controller 2007 discriminates whether a print task of which document name of which number of pages has been spooled, a spool size, a time when a printing request is issued, and the like and controls so as to display them onto the UI picture plane in FIG. 4. Thus, even if the user selects the background process, he can discriminate to which degree the print task has been progressed, so that use efficiency is improved.

It is assumed that step S207 can be activated solely independent of the activation from step S206 and that the designation of the storage destination or the like can be also performed in this case as well.

In step S208, the spool file reader 2008 reads the intermediate data to be printed from the spool file 2100.

In step S205, the intermediate data read in step S208 is converted into the bitmap data. As mentioned above, when the scaling print or the like has been set, in the bitmap converting process, the print information which is inputted at the input paper size is magnified or reduced and converted into the bitmap data likewise. Whether it is necessary to magnify or reduce will be explained in FIG. 6 and subsequent drawings. In case of executing the process by the foreground in step S204, it is assumed that the processing routine advances to step S205 as it is.

In step S209, the print data converter 2009 converts the bitmap data converted in step S205 into the print data in a format suitable for a desired print output of the printer 3000. In step S209, for example, the UI picture plane shown in FIG. 5 constructed by the GUI is displayed on the display 1006 and a print situation is displayed.

FIG. 5 shows an example of a UI picture plane for visually displaying the print situation of the print task. According to this UI, the number of pages during the printing and the number of copies during the printing are displayed by numerical values, and to which region in the page during the printing the print data has been formed is visually displayed and controlled. On this UI picture plane, when the user presses a "cancel" button 501, the print task is stopped and the data which is not printed yet is abandoned. When the user presses a "suspend" button 502, the print task is stopped temporarily. When the user presses the button 502 again, the print task can be restarted.

In step S210, the printer driver 2000 transmits the formed print data to the transmission processor 2010 of the system. The transmission processor 2010 transmits the print data obtained from the printer driver to the printer 3000.

The operation of the output mode setter 2001 in step S201 shown in FIG. 2 will now be described hereinbelow.

Figure 6:
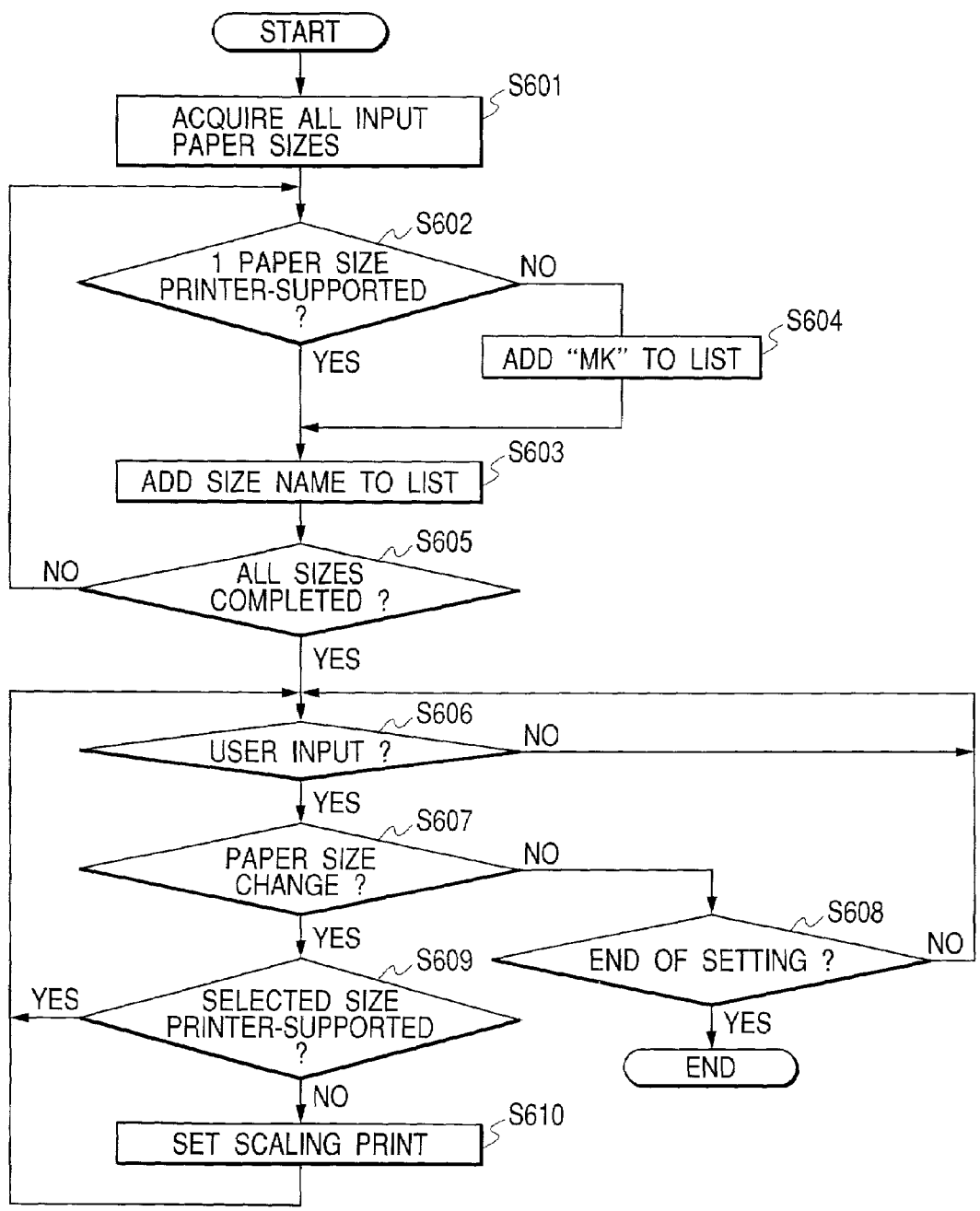
FIG. 6 is a flowchart showing an example of a second data processing procedure in the print control apparatus according to the invention.

FIG. 6 is a flowchart showing an example of a second data processing procedure in the print control apparatus according to the invention and corresponds to an example of the output mode setting processing procedure by the output mode setter 2001 as an output mode setting module. S601 to S610 denote processing steps.

Figure 7:
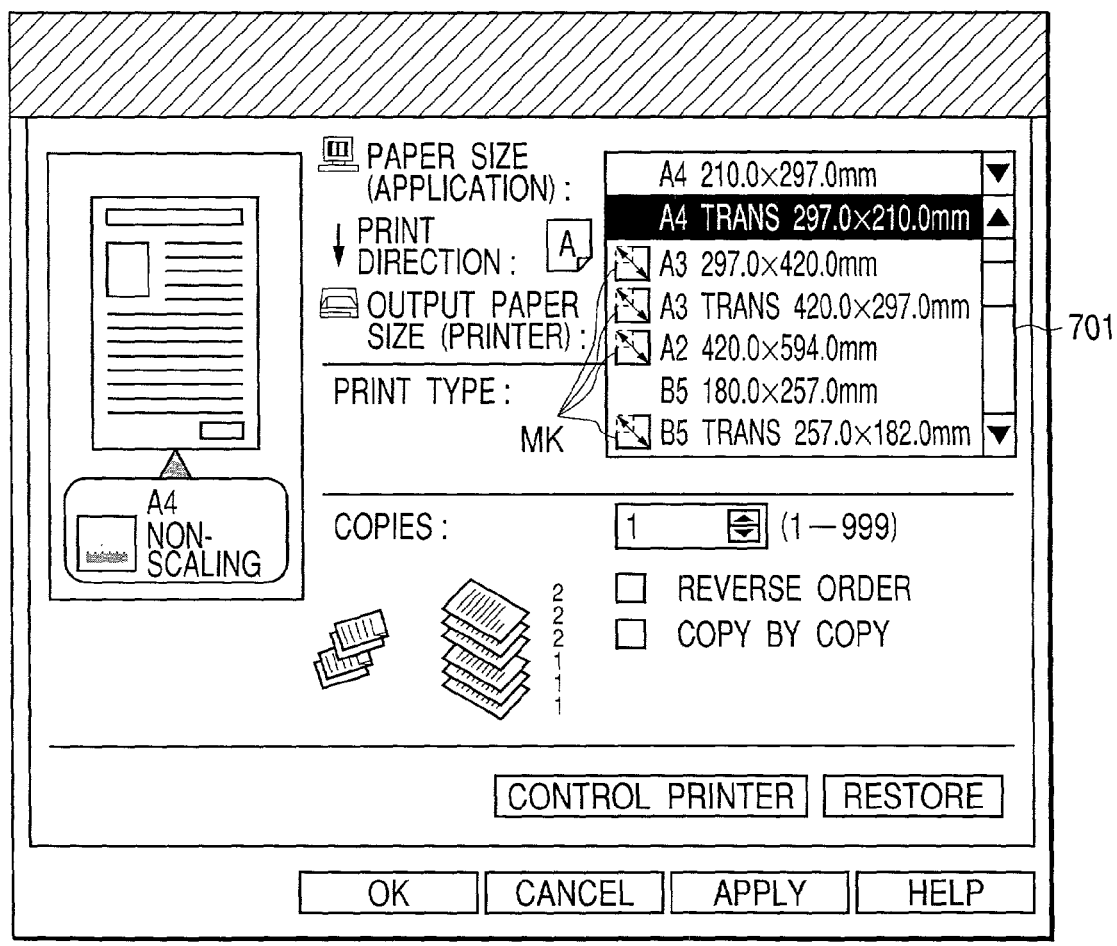
FIG. 7 is a diagram showing an example of an output mode setting picture plane in the print control apparatus according to the invention.

FIG. 7 is a diagram showing an example of an output mode setting picture plane in the print control apparatus according to the invention and corresponds to a state where the selectable paper sizes are displayed as a list into a predetermined region on an output mode setting picture plane. Although titles of selection items and the selection items are shown as lists, it is also possible to use a general display format such that the titles and only the items which are being selected are shown and a list is shown by pressing a button or the like arranged just near the predetermined region.

In FIG. 7, MK denotes a mark indicative of a paper size which is not supported as an output paper size. A message showing that the size is a paper size which is scaled and displayed is displayed so that it can be instantaneously distinguished from the paper size supported as an output paper size.

First, in step S601, the output mode setter 2001 obtains all of the paper sizes which are supported as input paper sizes of the printer driver. Subsequently, in step S602, the output mode setter 2001 discriminates whether the paper sizes obtained in step S601 are supported as output paper sizes of the printer 3000 or not. In step S603, if it is determined by the output mode setter 2001 that the obtained paper sizes are supported as output paper sizes of the printer 3000, only the paper size names are added to a selection item list 701 of the input paper sizes.

In step S602, if it is determined that the paper sizes are not supported as output paper sizes of the printer 3000, in step S604, the output mode setter 2001 adds a mark ("MK" in FIG. 7) indicative of a message showing that the paper sizes are not supported as output paper sizes of the printer 3000 is added to the selection item list 701 of the input paper sizes at a head of the paper size name or at a position near it. The processing routine advances to step S603. In this case, that is, in step S603, the names of the paper sizes to which the marks showing that the paper sizes are not supported as output paper sizes of the printer 3000 have been added in step S604 are added to the selection item list 701 of the input paper sizes.

In step S605, the output mode setter 2001 discriminates whether the addition of the paper size names to the list has been finished with respect to all of the paper sizes or not. If it is determined that the addition of the paper size names to the list is not finished yet with respect to all of the paper sizes, the processing routine is returned to step S602 and processes similar to those mentioned above are executed.

If it is determined in step S605 that the addition of the paper size names to the list has been finished with respect to all of the paper sizes, the output mode setter 2001 discriminates whether the user input has occurred or not in step S606. The apparatus waits until the user input occurs. If it is decided in step S606 that the user input has occurred, the output mode setter 2001 discriminates whether the selection of the paper size has been changed or not in step S607. If the selection of the paper size is not changed, the processing routine advances to step S608. If the selection of the paper size is changed, the processing routine advances to step S609. If it is determined in step S607 that the selection of the paper size is not changed, the output mode setter 2001 discriminates whether the setting process of the present module is finished or not in step S608. If it is determined that the setting process of the present module is not finished, the present setting state is held and the processing routine is returned to step S606. The apparatus waits until there is a user input.

If it is determined in step S608 that the setting process of the input paper size of the present module has been finished, the processing routine exits from the present module process.

If it is determined in step S607 that the selection of the paper size has been changed, in step S609, the output mode setter 2001 discriminates whether the selected input paper size is supported as an output paper size of the printer 3000 or not. If it is decided that the selected input paper size is supported as an output paper size of the printer 3000, the present setting state is held and the apparatus waits until there is a user input in step S606 again.

If it is decided in step S609 that the selected input paper size is not supported as an output paper size of the printer 3000, the output mode setter 2001 determines in step S610 that a "non-scaling print" (refer to the UI in FIG. 3) is impossible. Therefore, the scaling print is automatically set as a printing method. After the scaling print is automatically set, the apparatus waits until there is a user input in step S606 again. If it is decided in step S608 that the setting has been finished, the processing routine exits from the setting process of the present module. When the paper size which is not supported by the printer is selected as an input paper size 301 through the GUI of the printer driver, the zooming print (scaling print) is automatically set as a setting of the printing method. However, this means that in the selecting region 303 of the printing method, the printing method is changed to a state where the "scaling print" has been selected. After it is changed to this state, the printing method can be also changed to the "non-scaling print" or "banner print (longitudinal paper print)" by a manual operation by the user to the selecting region of the printing method.

According to the embodiment, in the printer control system, by enabling the papers of the large fixed sizes which are not supported as output paper sizes of the printer 3000 to be also selected as selection items of the input paper sizes from the application and by setting the zooming print (scaling print), even if the paper sizes which are not supported as output paper sizes of the printer are set to the input paper sizes, the print data can be formed.

In case of the paper sizes which are not supported as output paper sizes of the printer, in the setting list of the input paper sizes, the marks showing that the paper sizes are not supported as output paper sizes of the printer 3000 are added to the positions before the input paper size names and they are displayed as a list. Therefore, the user can easily discriminate whether the input paper size of the document formed by the application 1100 is supported as an output paper size of the printer or not. Further, if the paper size which is not supported as an output paper size of the printer is selected from the selection item list of the input paper sizes, the printer driver is automatically set to the zooming print (scaling print). Therefore, the data formed on the basis of the input paper size which is not supported as an output paper size of the printer can be printed.

A construction of a data processing program which can be read out by the print system to which the print control apparatus according to the invention can be applied will now be described hereinbelow with reference to a memory map shown in FIG. 8.

FIG. 8 is a diagram for explaining the memory map on a memory medium for storing various data processing programs which can be read out by the print system to which the print control apparatus according to the invention can be applied.

Although not shown in particular, there is a case where information for administrating a group of programs which are stored onto the memory medium, for example, version information, persons who made the programs, and the like are also stored, and information depending on the OS or the like on the program reading side, for example, icons for identifying and displaying the programs, and the like are also stored.

Further, data depending on the various programs is also administrated in the above directory. There is also a case where a program to install the various programs into a computer, and in the case where the installing program has been compressed, a program to decompress it, and the like are also stored.

The functions shown in FIGS. 2 and 6 in the embodiment can be also executed by a host computer in accordance with a program that is installed from the outside. In this case, the invention can be also applied to a case where information group including the programs is supplied to an output apparatus by a memory medium such as CD-ROM, flash memory, FD, or the like or from an external memory medium through a network.

The objects of the invention can be also accomplished by a method whereby a memory medium on which program codes of software to realize the functions of the embodiment mentioned above is supplied to a system or an apparatus, a computer (or a CPU or an MPU) of the system or apparatus reads out the program codes stored on the memory medium, and executes them.

In this case, the program codes themselves read out from the memory medium realize the novel functions of the invention, and the memory medium on which the program codes have been stored constructs the invention.

As a memory medium for supplying the program codes, for example, it is possible to use a floppy disk, a hard disk, an optical disk, a magnetooptic disk, a CD-ROM, a CD-R, a CD-RW, a DVD, a magnetic tape, a non-volatile memory card, an ROM, an EEPROM, or the like.

The invention incorporates not only a case where a computer executes the read-out program codes, so that the functions of the embodiment mentioned above are realized but also a case where an OS (Operating System) or the like which is operating on the computer executes a part or all of the actual processes on the basis of instructions of the program codes and the functions of the embodiment mentioned above are realized by those processes.

Further, the invention also incorporates a case where the program codes read out from the memory medium are written into a memory equipped for a function expanding board inserted into a computer or a function expanding unit connected to a computer and, thereafter, a CPU or the like provided for the function expanding board or function expanding unit executes a part or all of the actual processes on the basis of instructions of the program codes, and the functions of the embodiment mentioned above are realized by those processes.

As many apparently widely different embodiments of the present invention can be made without departing from the spirit and scope thereof, it is to be understood that the invention is not limited to the specific embodiments thereof except as defined in the appended claims.

As described above, according to the invention, the input paper size of the document which is inputted from the application and the output paper size of the print data which is printed by the printer are set. In the print control apparatus for forming the print data on the basis of the input paper size and output paper size which are set, when the input paper size is set, the paper sizes which are supported by the printer and the paper sizes which are not supported by the printer are displayed so that they can be discriminated. Therefore, the paper size which is not supported by the printer can be set as an input paper size of the document. There is an effect such that use efficiency of the user is improved.

According to the invention, if the set input paper size is the paper size which is not supported by the printer, since the zooming print is automatically set as a setting of the printing method, even when the paper size which is not supported by the printer is set as an input paper size, the operation by the user for obtaining the print result fitted to the output paper size is simplified and there is an effect such that use efficiency is improved.

What is claimed is:

1. An information processing apparatus serving as a host computer for processing a printing request from an application and generating print data, using a printer driver, which can be printed by a printer, comprising:
   display control means for controlling a display unit to display an output setting view screen in which a value of an output setting item is set, the output setting view screen being an user interface of the printer driver;
   determination means for determining whether a paper size which is supported as the input paper size of the printer driver is supported as the output paper size of the printer;
   paper size setting means for setting an input paper size of a document inputted from the application and an output paper size of print data printed by the printer via the output setting view screen displayed by said display control means; and
   generating means for generating the print data on the basis of the input paper size and the output paper size set by said paper size setting means,
   wherein when it is determined by said determination means that the paper size of the input paper size is supported as the output paper size of the printer, said display control means controls the display unit to display a paper name of the supported paper size in an input paper size list of the output setting view screen and,
   wherein when it is determined by said determination means that the paper size of the input paper size is not supported as the output paper size of the printer, said display control means controls the display unit to display, in the input paper size list of the output setting view screen, a paper name of the not supported paper size with a mark indicating that a resizing process will be performed.

2. An apparatus according to claim 1, wherein said paper size setting means sets the input paper size and the output paper size in response to an instruction which is inputted through a graphical user interface for performing a print setting.

3. An apparatus according to claim 1, further comprising printing method setting means for automatically setting a zooming print in the case where the input paper size which is set by said paper size setting means is the paper size which is not supported by said printer.

4. An apparatus according to claim 3, wherein in the case where the input paper size which is set by said paper size setting means is the paper size which is not supported by said printer, said printing method setting means automatically sets the zooming print as a setting of the printing method and, thereafter, can change the printing method by a manual operation.

5. An apparatus according to claim 1, wherein said paper size setting means adds a mark showing that the paper size is not supported to a position near a paper name of the input paper size corresponding to the paper size which is not supported by said printer and displays them.

6. An information processing method of processing a printing request from an application and generating print data, using a printer driver, which can be printed by a printer, comprising:
   a display control step of controlling a display unit to display an output setting view screen in which a value of an output setting item is set, the output setting view screen being an user interface of the printer driver;
   a determination step of determining whether a paper size which is supported as the input paper size of the printer driver is supported as the output paper size of the printer;
   a paper size setting step of setting an input paper size of a document inputted from the application and an output paper size of print data printed by the printer via the output setting view screen displayed by said display control step; and
   a generating step of generating the print data on the basis of the input paper size and the output paper size set by said paper size setting step,
   wherein when it is determined in said determination step that the paper size of the input paper size is supported as the output paper size of the printer, the display control step controls the display unit to display a paper name of the supported paper size in an input paper size list of the output setting view screen and,
   wherein when it is determined by said determination step that the paper size of the input paper size is not supported as the output paper size of the printer, the display control step controls the display unit to display, in the input paper size list of the output setting view screen, a paper name of the not supported paper size with a mark indicating that a resizing process will be performed.

7. A method according to claim 6, wherein in said paper size setting step, the input paper size and the output paper size are set in response to an instruction which is inputted through a graphical user interface for performing a print setting.

8. A method according to claim 6, further comprising a printing method setting step of automatically setting a zooming print as a setting of a printing method in the case where the input paper size which is set by said paper size setting step is the paper size which is not supported by said printer.

9. A method according to claim 8, wherein in said printing method setting step, in the case where the input paper size which is set by said paper size setting step is the paper size which is not supported by said printer, the zooming print is automatically set as a setting of the printing method and, thereafter, the printing method can be changed by a manual operation.

10. A method according to claim 6, wherein in said paper size setting step, a mark showing that the paper size is not supported is added to a position near a paper name of the input paper size corresponding to the paper size which is not supported by said printer and they are displayed.

11. A machine readable storage medium on which is stored an information processing program which can be executed by an information processing apparatus serving as a host computer for processing a printing request from an application and generating print data, using a printer driver, which can be printed by a printer, wherein said program allows the information processing apparatus to execute:

a display control step of controlling a display unit to display an output setting view screen in which a value of an output setting item is set, the output setting view screen being an user interface of the printer driver;

a determination step of determining whether a paper size which is supported as the input paper size of the printer driver is supported as the output paper size of the printer;

a paper size setting step of setting an input paper size of a document inputted from the application and an output paper size of print data printed by the printer via the output setting view screen displayed by said display control step; and a generating step of generating the print data on the basis of the input paper size and the output paper size set by said paper size setting step, wherein the information processing apparatus is executed in a manner such that when it is determined in said determination step that the paper size of the input paper size is supported as the output paper size of the printer, the display control step controls the display unit to display a paper name of the supported paper size in an input paper size list of the output setting view screen and, wherein when it is determined by said determination step that the paper size of the input paper size is not supported as the output paper size of the printer, the display control step controls the display unit to display, in the input paper size list of the output setting view screen, a paper name of the not supported paper size with a mark indicating that a resizing process will be performed.

12. A storage medium according to claim 11, wherein said information processing program is executed in a manner such that in said paper size setting step, the input paper size and the output paper size are set in response to an instruction which is inputted through a graphical user interface for performing a print setting.

13. A storage medium according to claim 11, wherein said information processing program further executes a printing method setting step of automatically setting a zooming print as a setting of a printing method in the case where the input paper size which is set by said paper size setting step is the paper size which is not supported by said printer.

14. A storage medium according to claim 13, wherein said information processing program is executed in a manner such that in said printing method setting step, in the case where the input paper size which is set by said paper size setting step is the paper size which is not supported by said printer, the zooming print is automatically set as a setting of the printing method and, thereafter, the printing method can be changed by a manual operation.

15. A storage medium according to claim 11, wherein said information processing program is executed in a manner such that in said paper size setting step, a mark showing that the paper size is not supported is added to a position near a paper name of the input paper size corresponding to the paper size which is not supported by said printer and they are displayed.

* * * * *

UNITED STATES PATENT AND TRADEMARK OFFICE
CERTIFICATE OF CORRECTION

PATENT NO. : 7,054,016 B2
APPLICATION NO. : 09/930452
DATED : May 30, 2006
INVENTOR(S) : Koji Nagata It is certified that error appears in the above-identified patent and that said Letters Patent is hereby corrected as shown below:

COVER PAGE AT ITEM (30):
Foreign Application Priority Data, "2000/248102" should read --2000-248102--.

COLUMN 3:
Line 57, "remain." should read --remains.--.
Line 58, "outputs" should read --output--.

COLUMN 4:
Line 65, "step 5205." should read --step S205.--

COLUMN 5:
Line 5, "to" should be deleted.

COLUMN 9:
Line 44, "an" should read --a--.

COLUMN 10:
Line 34, "an" should read --a--.

COLUMN 11:
Line 27, "an" should read --a--.

Signed and Sealed this

Sixth Day of March, 2007

JON W. DUDAS
*Director of the United States Patent and Trademark Office*